Oct. 26, 1943.  B. H. DAVIS  2,332,993
VEHICLE ANCHOR MEANS
Filed April 3, 1942  2 Sheets-Sheet 1

Inventor
Benjamin H. Davis

Oct. 26, 1943.                    B. H. DAVIS                    2,332,993
                              VEHICLE ANCHOR MEANS
                              Filed April 3, 1942                 2 Sheets-Sheet 2

Inventor
Benjamin H. Davis

By Clarence A. O'Brien
and Harvey B. Jacobson
Attorneys

Patented Oct. 26, 1943

2,332,993

UNITED STATES PATENT OFFICE 2,332,993

VEHICLE ANCHOR MEANS

Benjamin H. Davis, Valois, N. Y.

Application April 3, 1942, Serial No. 437,598

1 Claim. (Cl. 188—32)

This invention relates to new and useful improvements for vehicles, useful in anchoring a car against slipping, as when one corner portion of the vehicle is being jacked up.

The principal object of the present invention is to provide a simple anchoring device upon which one wheel of a vehicle can be driven, thus permitting the vehicle to get a bite on the ground surface that will be sufficient to prevent the vehicle from slipping, when the vehicle is jacked up, especially when bumper jacks are to be used.

Other objects and advantages of the invention will become apparent to the reader of the following description.

In the drawings:

Figure 3 is a top plan view.

Figure 1:
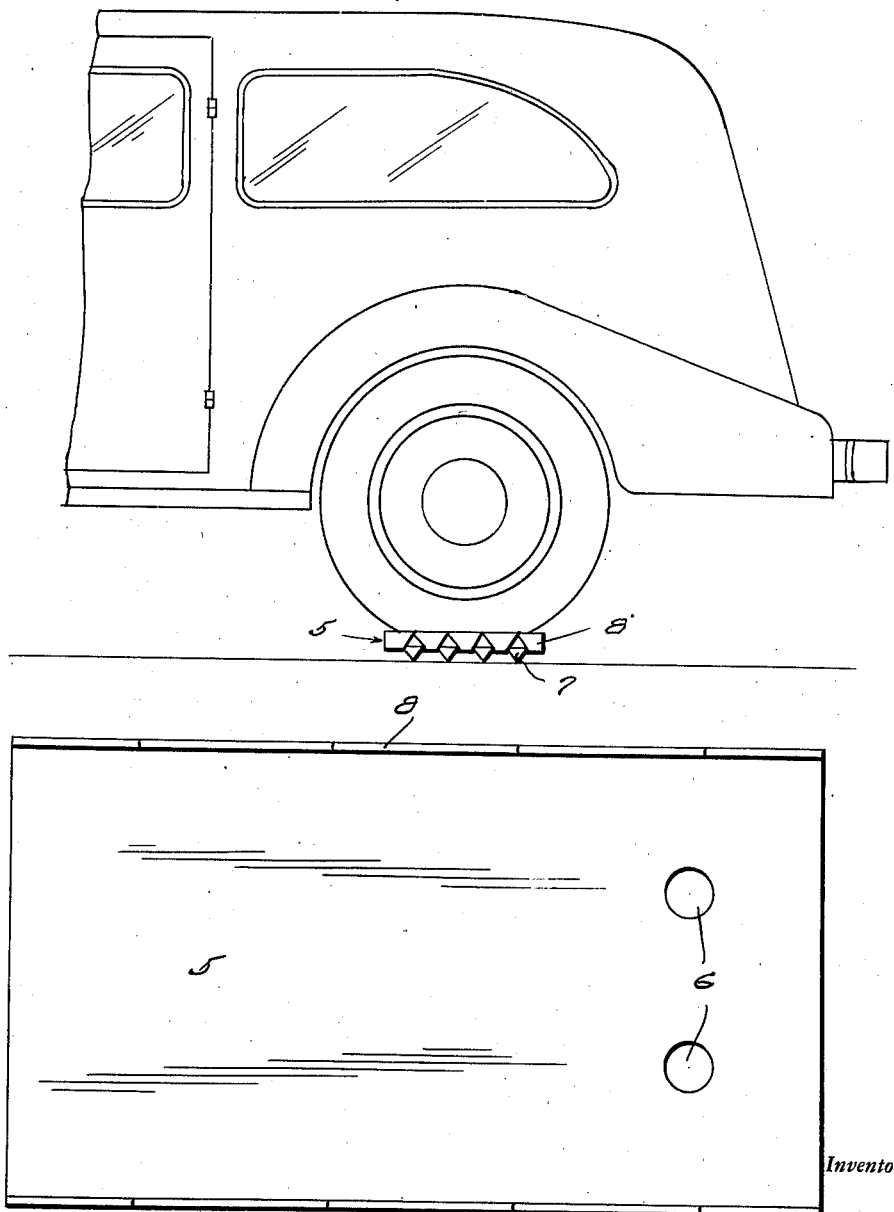
Figure 1 represents a fragmentary side elevational view of a vehicle with one wheel resting on the improved device.
Figure 2:
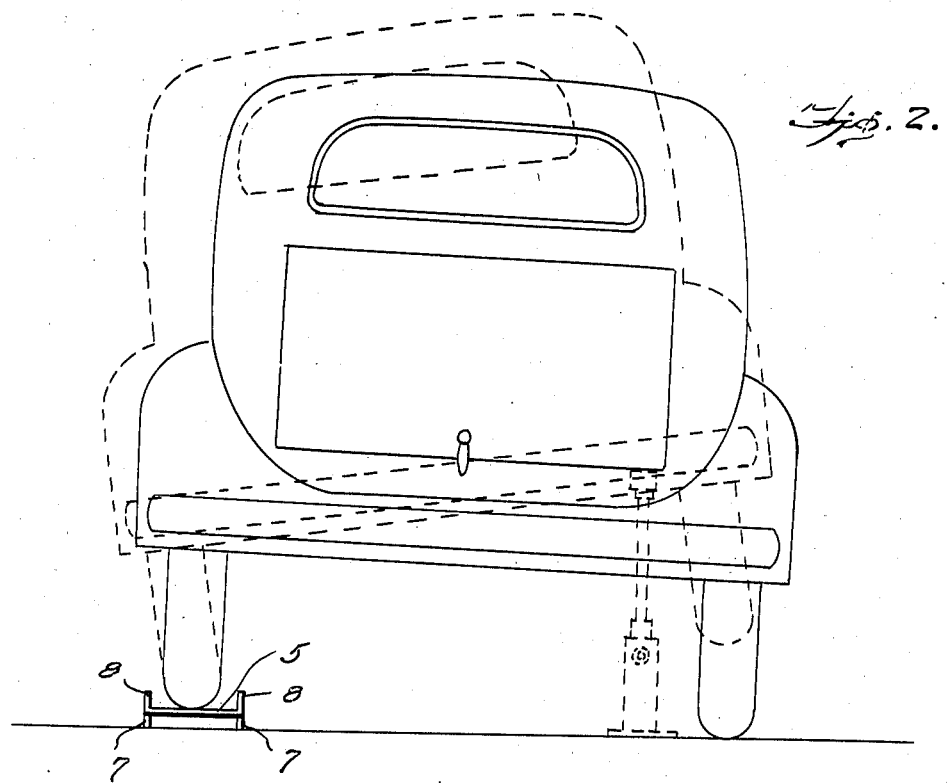
Figure 2 is a rear elevational view showing a vehicle with one wheel on the anchoring device.
Figure 4:
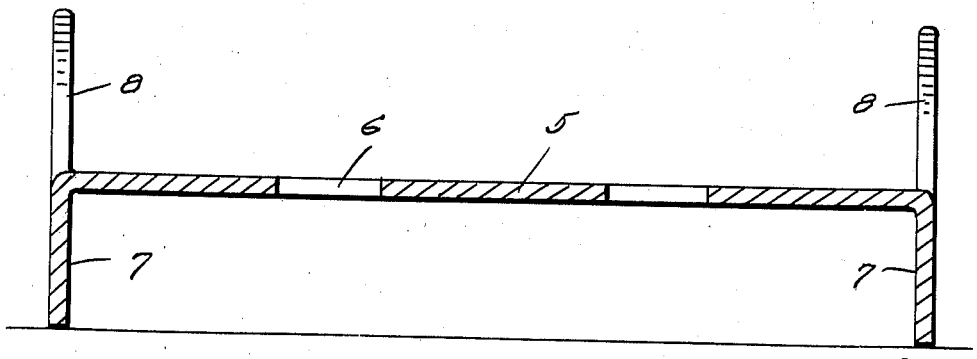
Figure 4 is a cross-sectional view.

Referring to the drawings wherein like numerals designate like parts, it can be seen that numeral 5 denotes a substantially rectangular-shaped plate having finger receiving openings 6 in one end portion thereof.

The side edge portions of this plate 5 are bent upwardly and stamped to provide triangular-shaped teeth 7, which are bent downwardly, as shown in Figure 1, defining spurs which bite into the ground when a wheel of a vehicle is resting upon the plate 5. Of course, the flanges 8 from which the spurs or teeth 7 are struck are upstanding to prevent any shifting of the wheel of a vehicle off of the plate 5.

Obviously, the vehicle can easily be run onto the device.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tire anchoring device comprising a plate provided with upstanding side flanges, and spurs struck from the upstanding flanges and turned downwardly to depend below the plate to bite into the ground when a load is imposed on the plate.

BENJAMIN H. DAVIS.